US008646710B2

(12) United States Patent
Ronin

(10) Patent No.: US 8,646,710 B2
(45) Date of Patent: Feb. 11, 2014

(54) VIBRATORY MILL

(75) Inventor: Vladimir Ronin, Lulea (SE)

(73) Assignee: Procedo Enterprises Etablissement, Vaduz (LI)

( * ) Notice: Subject to any disclaimer, the term of this patent is extended or adjusted under 35 U.S.C. 154(b) by 208 days.

(21) Appl. No.: 13/094,854

(22) Filed: Apr. 27, 2011

(65) Prior Publication Data

US 2012/0267463 A1    Oct. 25, 2012

(30) Foreign Application Priority Data

Apr. 21, 2011   (SE) .................................... 1150354-7

(51) Int. Cl.
*B02C 17/08* (2006.01)
(52) U.S. Cl.
USPC .......................................... 241/175; 241/179
(58) Field of Classification Search
USPC ................................................. 241/175, 179
See application file for complete search history.

(56) References Cited

U.S. PATENT DOCUMENTS

| 1,859,499 | A | * | 5/1932 | Jean Deschamps Jules ... 241/54 |
| 2,789,773 | A | | 4/1957 | Stauber |
| 3,212,723 | A | * | 10/1965 | Heinz-Jochem Maeder et al. ................ 241/171 |
| 4,498,634 | A | * | 2/1985 | Nelson et al. ................... 241/72 |
| 6,818,058 | B2 | | 11/2004 | Ronin |
| 6,936,098 | B2 | | 8/2005 | Ronin |

FOREIGN PATENT DOCUMENTS

| CA | 569 381 A | 1/1959 |
| SE | 524 154 C2 | 7/2004 |
| SE | 524 393 C2 | 8/2004 |

* cited by examiner

*Primary Examiner* — Dana Ross
*Assistant Examiner* — Chwen-wei Su
(74) *Attorney, Agent, or Firm* — Young & Thompson

(57) ABSTRACT

A vibratory mill principally for the treatment of cement and fly ash, which mill has a grinding chamber (1) with a wall (6, 7) at each of the two ends of the chamber, which mill includes an inlet (2) for material that is to be treated and an outlet (3) at the rear wall (7) of the grinding chamber (1), at the lower part of the grinding chamber, and a first wall (5) inside the chamber at the end at which the outlet (3) is located, which wall (5) is provided with one or several openings (8) at its upper part, which openings allow passage of material that has been sufficiently ground from the grinding chamber to the outlet (3). The inlet (2) is located in the lower part of the grinding chamber (1) at the wall (6) that is opposite to the location of the outlet.

19 Claims, 1 Drawing Sheet

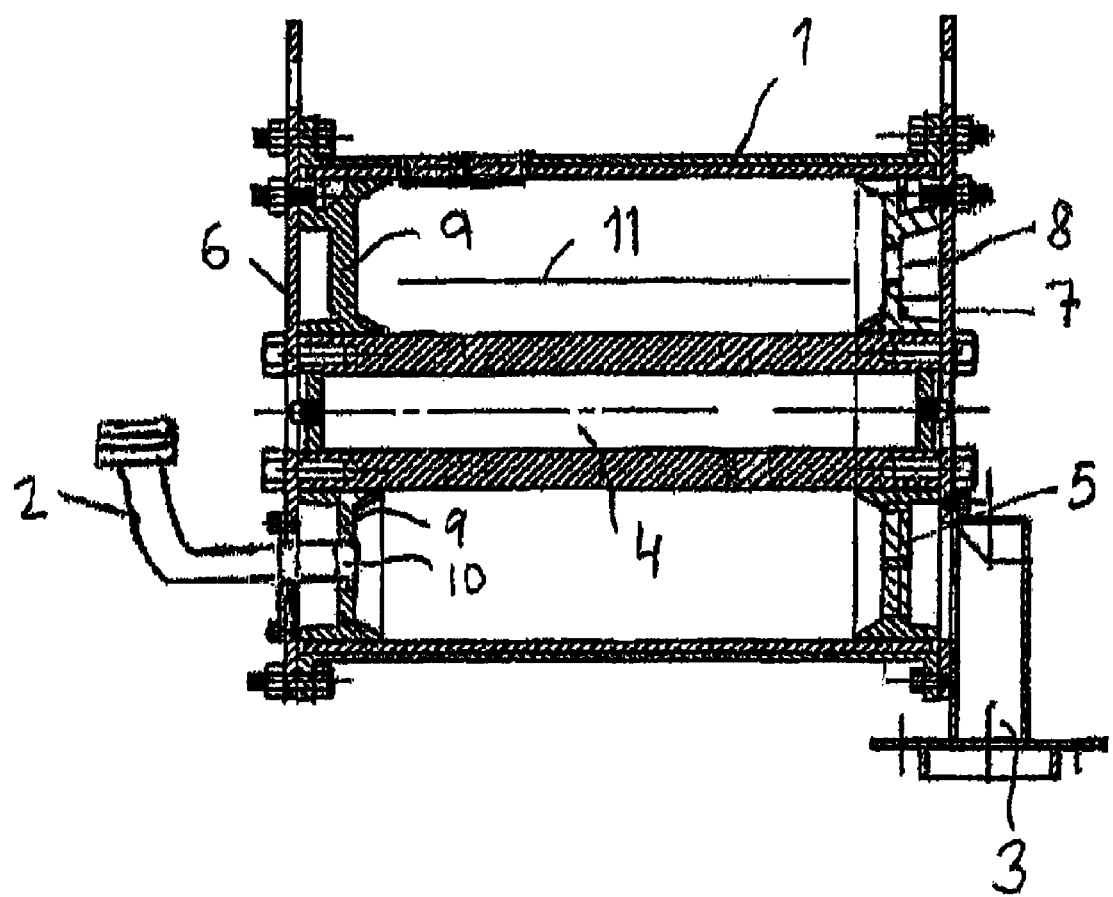

VIBRATORY MILL

The present invention relates to a vibratory mill for the treatment of cement and fly ash.

BACKGROUND OF THE INVENTION

The vibratory mill is of the type in which the mill contains grinding bodies. These grind down the material that is to be treated and expose the treated material to powerful blows, which lead to the surface energy and chemical reactivity of the ground particles increasing.

The Swedish patent number 524 393 "Method for treatment of fly ash" and the Swedish patent number 524 154 "Process for producing blended cements with reduced carbon dioxide emissions" describe such grinding processes.

Here, the mechanical activation of Portland cement is described, together with that of various other materials such as fly ash, granulated blast furnace slag (GBFS), and finely divided quartz sand mixed at various proportions, by the use of a vibratory mill with grinding bodies and with an amplitude of vibration of 2-20 mm and a frequency of 800-2,000 vibrations per minute.

A second vibratory mill is a mill denoted VBM 3034, manufactured by Metso Minerals, Finland.

A major disadvantage of existing vibratory mills is that the ratio of length to diameter is small, and this leads to a short retention time for material that circulates in the mill.

The Canadian patent CA 569381 describes a vibratory mill of the present type.

The mill has a grinding chamber with a wall at each end of the chamber. An inlet for material that is to be treated is located at the upper part of the chamber. An outlet is located at the opposite end of the chamber at the lower part of the chamber. A wall is present inside the chamber, at the end at which the outlet is located, provided with openings that allow the passage of material that has been sufficiently ground, which material falls down towards the outlet after it has passed the wall that is provided with openings. An impenetrable wall is present at approximately the centre of the chamber and located in its upper part, which wall prevents material being transported directly from the input through the upper part of the mill to the wall that is provided with openings and through this to the outlet, which, in combination with the above-mentioned ratio of length to diameter, would lead to a very short retention time in the mill. This impenetrable wall, however, is subject to extensive wear by the grinding bodies, and it must for this reason be exchanged approximately every third day. This leads, naturally, to interruption in service and thus costs.

The present invention solves this problem.

SUMMARY OF THE INVENTION

The present invention thus relates to a vibratory mill principally for the treatment of cement and fly ash, which mill has a grinding chamber with a wall at each of the two ends of the chamber, and which mill comprises an inlet for material that is to be treated and an outlet at the rear wall of the grinding chamber, at the lower part of the grinding chamber, and a first wall inside the chamber at the end at which the outlet is located, which wall is provided with one or several openings at its upper part, which openings allow passage of material that has been sufficiently ground from the grinding chamber to the outlet. The invention is characterised in that the inlet is located in the lower part of the grinding chamber at the wall that stands opposite to the location of the outlet.

BRIEF DESCRIPTION OF THE DRAWINGS

The invention will be described below, partly in association with an embodiment of the invention shown in the attached drawing, where FIG. 1 shows a cross-section of a grinding chamber.

Reference number 1 in FIG. 1 denotes a grinding chamber, 2 an inlet, 3 an outlet, 4 a central pipe, 5 a wall in order to retain grinding bodies, 6 the front wall of the grinding chamber and 7 the rear wall of the grinding chamber. The reference number 8 denotes an opening in the wall denoted 5.

DETAILED DESCRIPTION OF THE PREFERRED EMBODIMENTS

A vibratory mill, principally for the treatment of cement and fly ash, is shown in FIG. 1 which mill has a grinding chamber 1 with a wall 6, 7 at each end of the two ends of the chamber, which mill comprises an inlet 2 for material that is to be treated and an outlet 3 at the rear wall 7 of the grinding chamber, at the lower part of the grinding chamber. A first wall 5 is located inside the chamber at the end at which the outlet 3 is located, which wall is provided with one or several openings 8 in its upper part. The openings allow passage of material that has been sufficiently ground from the grinding chamber 1 to the outlet 3.

According to the invention, the inlet 2 is located in the lower part of the grinding chamber 1 at the wall 6 that stands opposite to the location of the outlet 3.

The grinding chamber 1 is cylindrical. A driven shaft, not shown in the drawing, is located in the central pipe 4 and executes eccentric motion such that the drum vibrates without rotating. The eccentric motion is achieved in a conventional manner through the shaft that runs through the pipe 4 being provided with weights outside of the grinding chamber, which weights are asymmetrically located on the shaft.

Conventional grinding bodies of metal are located inside the grinding chamber, which grinding bodies grind down the material that is to be ground. The grinding bodies may be cylindrical with a length of 5-7 cm and with a diameter of 1-3 cm. The material that is to be ground is exposed during grinding to many powerful blows from the grinding bodies, and this increases the chemical reactivity of the material. A mass that is similar to a fluidised bed is formed through the vibration of the grinding chamber and the grinding bodies that are located inside it together with the material that is to be ground.

According to one preferred embodiment, the said opening 10 in the second wall 9 is located at a distance from the bottom of the grinding chamber that is 10-30% of the radius of the grinding chamber.

According to a second preferred embodiment, the said opening or openings 8 in the said first wall 5 has or have a total surface area that is 1-60% of the surface area of the first wall 5.

Through the material that is to be ground being fed into the lower part of the grinding chamber and fed out at the upper part of the grinding chamber on the opposite side of the grinding chamber from that of the inlet, the retention time of the material in the grinding chamber will be considerably longer than the retention time when the material is fed into the upper part of the grinding chamber, as is the case in the mill according to the said Canadian patent.

The retention time in a conventional mill of the present type can be 1.5-2 minutes. The comparable retention time in the present mill of the same dimensions can be 3.5-5 minutes.

The line 11 in FIG. 1 specifies the level of 80% of maximal load, which is a suitable level of load for grinding. The load in this case then consists of not only grinding bodies but also the material that is to be ground.

Furthermore, material that has been introduced cannot pass directly to the outlet, as has been mentioned above in association with the Canadian patent. For this reason, an impenetrable wall is not necessary to prevent such direct passage.

According to one preferred design, a second wall 9 is present inside the grinding chamber, which second wall is located at the inlet 2 and is provided with an opening 10 at its lower part for the introduction of material that is to be ground.

The said first wall 5 and the said second wall 9 are circular with a central hole for the said pipe 4.

Thus, the present invention solves the problem described in the introduction.

The tables below present results from an experiment with fly ash of Class F according to ASTM C 618, and show that the fly ash acquires a higher degree of fineness and a higher chemical activity after being ground with a vibratory mill according to the present invention.

TABLE 1

Particle size

| Particle size | Fraction | |
| --- | --- | --- |
| | Traditional vibratory mill | Vibratory mill according to the invention |
| 1 micrometer | 27 | 55 |
| 10 micrometer | 55 | 67 |
| 45 micrometer | 97 | 95 |

TABLE 2

Development of strength according to ASTM C 109

| Type of cement-based material | Compressive strength, MPa Curing time, days | | | |
| --- | --- | --- | --- | --- |
| | 1 | 3 | 7 | 28 |
| Portland cement (PC) | 10.2 | 26.5 | 30 | 38.6 |
| 50% PC + 50% fly ash ** | 8.5 | 24.7 | 31.2 | 42.1 |
| 50% PC + 50% fly ash * | 12.3 | 28.7 | 35.2 | 48.1 |

\* Fly ash treated in a mill according to the present invention
\*\* Fly ash treated in a traditional mill As the tables make clear, fly ash that has been treated in a vibratory mill according to the present invention has a significantly higher fraction of particles in the 1-10 micrometer interval and a significantly higher chemical reactivity, which leads to a significantly higher compressive strength for both a short and a long curing time. This leads to it being possible to replace a greater fraction of Portland cement by fly ash.

Various embodiments have been described above. It is, however, obvious that the design of the inlet can be altered as can also the proportions of the grinding chamber with respect to the ratio of its length to its diameter.

The present invention, therefore, is not to be considered to be limited to the embodiments specified above but it can be varied within the scope specified by the attached patent claims.

The invention claimed is:

1. A vibratory mill principally for the treatment of cement and fly ash, comprising:
    a grinding chamber (1), with a rear wall (7) and a front wall (6) opposite the rear wall (7);
    an inlet (2) into the grinding chamber (1) for entry of material that is to be treated, and an outlet (3) for exiting the grinding chamber (1) at the rear wall (7) of the grinding chamber (1), both the inlet (2) and the outlet (3) being located at a lower part of the grinding chamber (1); and
    a first wall (5) inside the grinding chamber (1) at a same end of the grinding chamber (1) as the outlet (3), said first wall (5) having an upper part provided with one or several openings (8), said one or several openings configured to permit passage of material that has been sufficiently ground from the grinding chamber (1) to the outlet (3),
    wherein the inlet (2) is located in the lower part of the grinding chamber (1) at the front wall (6) that is opposite to the location of the outlet (3).

2. The vibratory mill according to claim 1, further comprising:
    a second wall (9) inside the grinding chamber, said second wall located at the inlet (2), a lower part of the second wall (9) provided with an opening (10) for the introduction of material to be ground.

3. The vibratory mill according to claim 1, wherein said opening or openings (8) in the first wall (5) have a total surface area that is 1-60% of the surface area of the first wall (5).

4. The vibratory mill according to claim 2, wherein the opening (10) in the second wall (9) is located at a distance from the bottom of the grinding chamber that is 10-30% of the radius of the grinding chamber.

5. The vibratory mill according to claim 2, wherein said one or several openings (8) in the first wall (5) have a total surface area that is 1-60% of the surface area of the first wall (5).

6. The vibratory mill according to claim 4, wherein said one or several openings (8) in the first wall (5) have a total surface area that is 1-60% of the surface area of the first wall (5).

7. The vibratory mill according to claim 1, further comprising:
    a central pipe (4) extending through a center of the grinding chamber (1) from the front wall (6) to the rear wall (7), the inlet (2) and the outlet (3) both being located at a level beneath the central pipe (4).

8. The vibratory mill according to claim 1, wherein a lower part of the first wall (5), beneath the upper part, is free of said one or several openings.

9. The vibratory mill according to claim 8, wherein said one or several openings (8) in the first wall (5) have a total surface area that is 1-60% of the surface area of the first wall (5).

10. The vibratory mill according to claim 8, wherein a second wall (9) is present inside the grinding chamber, said second wall is located at the inlet (2), a lower part of the second wall (9) provided with an opening (10) for the introduction of material to be ground.

11. The vibratory mill according to claim 10, wherein the opening (10) in the second wall (9) is located at a distance from the bottom of the grinding chamber that is 10-30% of the radius of the grinding chamber.

12. The vibratory mill according to claim 11, wherein said one or several openings (8) in the first wall (5) have a total surface area that is 1-60% of the surface area of the first wall (5).

13. The vibratory mill according to claim 12, further comprising:
a central pipe (4) extending through a center of the grinding chamber (1) from the front wall (6) to the rear wall (7), the inlet (2) and the outlet (3) both being located at a level beneath the central pipe (4).

14. The vibratory mill according to claim 1, wherein the first wall (5) and the rear wall (7) are spaced apart from each other to form a passage between the grinding chamber (1) and the outlet (3).

15. The vibratory mill according to claim 14, further comprising:
a central pipe (4) extending through a center of the grinding chamber (1) from the front wall (6) to the rear wall (7), the inlet (2) and the outlet (3) both being located at a level beneath the central pipe (4).

16. The vibratory mill according to claim 15, wherein the upper part of the first wall (5) is located above the central pipe (4), and a lower part of the first wall (5), beneath the upper part, is free of said one or several openings.

17. The vibratory mill according to claim 16, wherein the grinding chamber also includes a second wall (9) that is located at the inlet (2) and spaced from the front wall (6), a lower part of the second wall (9) beneath the central pipe (4) provided with an opening (10) in communication with the inlet for the introduction of material to be ground.

18. The vibratory mill according to claim 17, wherein said one or several openings (8) in the first wall (5) have a total surface area that is 1-60% of the surface area of the first wall (5).

19. The vibratory mill according to claim 18, wherein the opening (10) in the second wall (9) is located at a distance from the bottom of the grinding chamber that is 10-30% of the radius of the grinding chamber.

* * * * *